(12) United States Patent
Chang et al.

(10) Patent No.: US 6,768,047 B2
(45) Date of Patent: Jul. 27, 2004

(54) AUTONOMOUS SOLID STATE LIGHTING SYSTEM

(75) Inventors: Chin Chang, Yorktown Heights, NY (US); Gert W. Bruning, Sleepy Hollow, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/170,906

(22) Filed: Jun. 13, 2002

(65) Prior Publication Data

US 2003/0230334 A1 Dec. 18, 2003

(51) Int. Cl.$^7$ .............................. H01L 31/042; F21L 4/00
(52) U.S. Cl. .................. 136/244; 136/291; 136/293; 362/182; 362/234; 362/276; 362/800; 323/906; 429/111
(58) Field of Search ................................. 136/244, 291, 136/293; 362/183, 234, 276, 800; 323/906; 429/111, 12

(56) References Cited

U.S. PATENT DOCUMENTS 4,384,317 A * 5/1983 Stackpole .................. 362/183
6,076,294 A * 6/2000 Durbin ........................ 40/544
6,194,793 B1 * 2/2001 Fisher, Jr. .................... 307/66

OTHER PUBLICATIONS

Wu et al, "Single–Stage Converters for Photovoltaic Powered Lighting Systems with MPPT and Charging Features," IEEE, (1998), pp. 1149–1155.*

* cited by examiner

Primary Examiner—Alan Diamond

(57) ABSTRACT

An autonomous solid state lighting system has a charge mode which collects energy and produces electric power with a solid state energy source, converts the voltage of the electric power using a bi-directional power converter, and stores the power in an energy storage device. A discharge mode draws electric power from the energy storage device, converts the voltage of the electric power using the bi-directional power converter, and produces light from a solid state light source. A controller controls the charge and discharge modes. In one embodiment, the solid state energy source can be a solar cell panel, the solid state light source can be an LED module, and the energy storage device can be a battery pack.

26 Claims, 4 Drawing Sheets

AUTONOMOUS SOLID STATE LIGHTING SYSTEM

FIELD OF THE INVENTION

This invention relates generally to a solid state lighting system. Specifically, it relates to the use of solid state solar cell, fuel cell and light emitting diode (LED) technologies with a bi-directional power converter to produce an efficient autonomous lighting system.

BACKGROUND OF THE INVENTION

Delivery of electric power to remote areas introduces a difficult challenge, as it is both complex and costly to transmit power to these areas. Transmission lines constructed to carry power may be expensive and environmentally undesirable. Distribution from the utility power grid may require the construction of transformers and switch yards, which may be impractical or prohibitively expensive. In addition, mercury vapor lighting as often used for rural and outdoor lighting is less desirable due to public concerns about mercury.

Solid state energy cell technology has been emerging as a useful alternative energy source for electrical equipment. Solar cells are a form of solid state cell technology used to convert light energy into electrical energy. Solid state lighting sources, such as light emitting diode (LEDs), are being used more frequently as the technology advances and becomes more cost efficient.

Solar cells are increasingly being used as clean energy sources for many different applications, especially in rural areas. Typically, a power converter is used to convert the solar cell current to the voltage/current waveform for the end user's equipment. For lighting applications, the energy collected from solar cell panels during the daytime is stored in a battery pack after passing through a power converter. During the nighttime, the energy stored in the battery is released to lights through another different power converter. The use of two power converters requires independent systems with separate magnetic and semiconductor components, increasing cost and complexity.

It would be desirable, therefore, to provide an autonomous solid state lighting system with a single power converter that overcomes the above disadvantages.

SUMMARY OF THE INVENTION

One aspect of the present invention provides an autonomous solid state lighting system suitable to supply power in rural areas and for outdoor lighting.

Another aspect of the present invention provides an autonomous solid state lighting system to supply power independent of the power grid.

Another aspect of the present invention provides an autonomous solid state lighting system to provide lighting without the use of mercury.

Another aspect of the present invention provides an autonomous solid state lighting system using a single power converter to reduce cost and complexity.

Another aspect of the present invention uses an alternative energy source, such as a fuel cell.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

The autonomous solid state lighting system of the present invention has a charge mode which collects energy and produces electric power with a solid state energy source, converts the voltage of the electric power using a bi-directional power converter, and stores the power in an energy storage device, and has a discharge mode which draws electric power from the energy storage device, converts the voltage of the electric power using the bi-directional power converter, and produces light from a solid state light source. A controller controls the charge and discharge modes. In one embodiment, the solid state energy source can be a solar cell panel, the solid state light source can be an LED module, and the energy storage device can be a battery pack.

Figure 1:
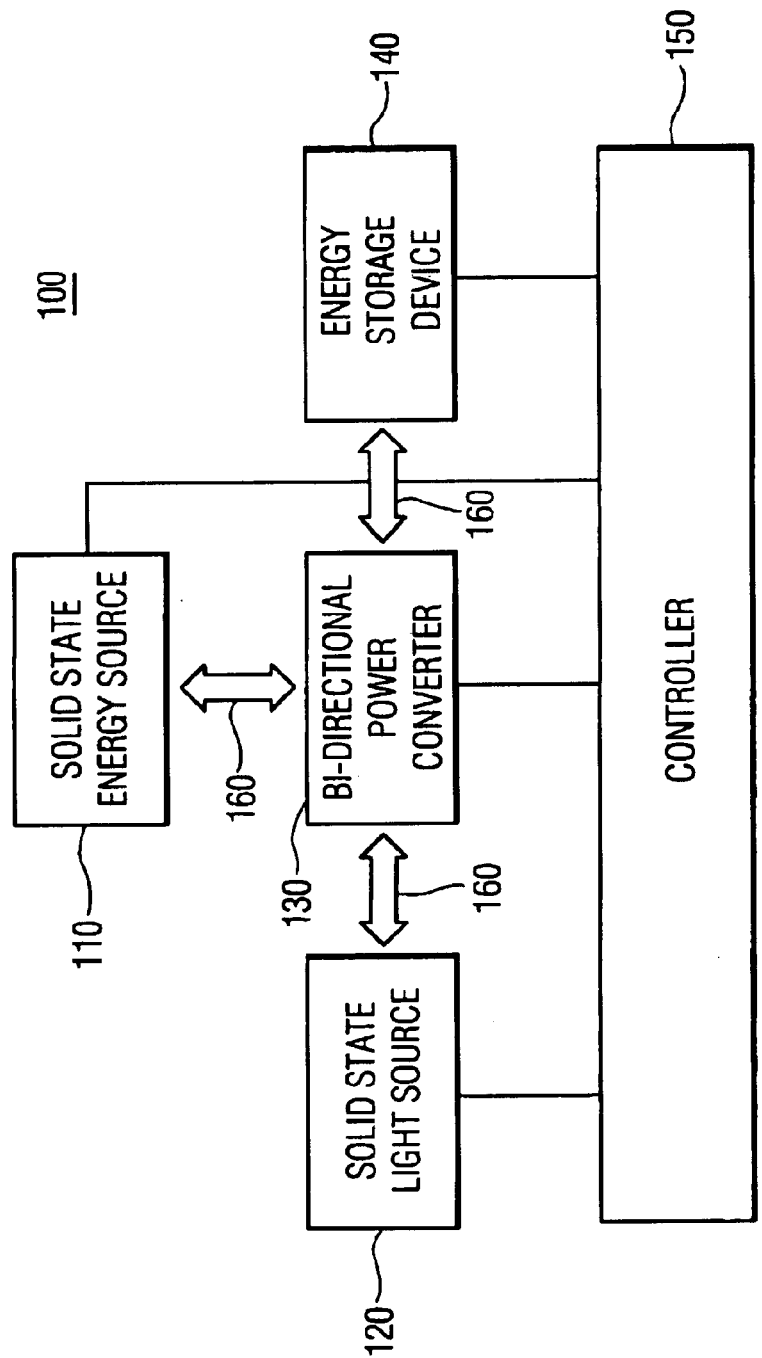
FIG. 1 is a block diagram of one embodiment of a system to provide an autonomous solid state lighting system in accordance with the present invention.

FIG. 1 shows one embodiment of a system to provide an autonomous solid state lighting system in accordance with the present invention and shown generally at 100. The lighting system 100 may include one or more solid state energy sources 110, one or more solid state light sources 120, at least one bi-directional power converter 130, one or more energy storage devices 140, and one or more controllers 150. Electric power 160 may be transferred from solid state energy source 110 through bi-directional power converter 130 to energy storage device 140, and from energy storage device 140 through bi-directional power converter 130 to solid state light source 120. A bi-directional power converter thus passes current in opposite directions.

The solid state energy source 110 may be powered by air, by water, by combustion, by light, fuel cells, or any other suitable solid state energy source to produce electric power. In a preferred embodiment, the energy source may be a solar energy source, such as a solar cell. The solid state energy source 110 may be connected to the solid state light source 120, the bi-directional power converter 130, the energy storage device 140, or the controller 150 by copper wires or any other suitable wiring known in the art.

The solid state light source 120 may be at least one light emitting diode, at least one light emitting diode (LED) module, at least one or more organic LED module, or any suitable solid state light source known in the art. In a preferred embodiment, the light source may be at least one LED module. The solid state light source 120 may be connected to the solid state energy source 110 and the bi-directional power converter 130 by copper wires or any other suitable wiring known in the art.

The bi-directional power converter 130 may be used to take an electric power source and increase (step up/boost) or decrease (step down/buck) voltage for appropriate use in the lighting system 100. For example, the solid state energy source 110 converts solar energy into electric power. The voltage of the electric power produced at the solid state energy source 110 may be stepped up by the bi-directional power converter 130 and stored in the energy storage device 140. The voltage of the electric power stored in the energy storage device 140 may be stepped down by the bi-directional power converter 130 to provide the appropriate level of electric power to the solid state light source 120, based on the power rating of the solid state light source 120. The bi-directional power converter 130 may be connected to the solid state light source 120, the energy storage device 140, or the controller 150 by copper wires or any other suitable wiring known in the art.

The energy storage device 140 may be a battery pack, fuel cell, capacitor or any other suitable energy source known in the art. In a preferred embodiment, the energy storage device is a battery pack. The energy storage device 140 may be used to hold the stepped up electric power and may release the electric power on demand. The energy storage device 140 may be connected to the solid state light source 120, the solid state energy source 110, the bi-directional power converter 130 or the controller 150 by copper wires or any other suitable wiring known in the art.

The system 100 may also include a controller 150 which may be any suitable hardware or software, or combination of hardware and software, that may direct the electric power 160 from the solid state energy source 110 to the energy storage device 140, the solid state light source 120, the bi-directional power converter 130 or the controller 150. The controller may be connected to the solid state energy source 110, the energy storage device 140, the solid state light source 120, or the bi-directional power converter 130 by copper wire or any suitable type of connection well known in the art.

In one embodiment, one or more components of the lighting system 100 may be contained in a single silicon chip or provided on a single printed circuit board. For example, the solid state energy source 110 and solid state light source 120 may be formed on a single chip or module.

Figure 2:
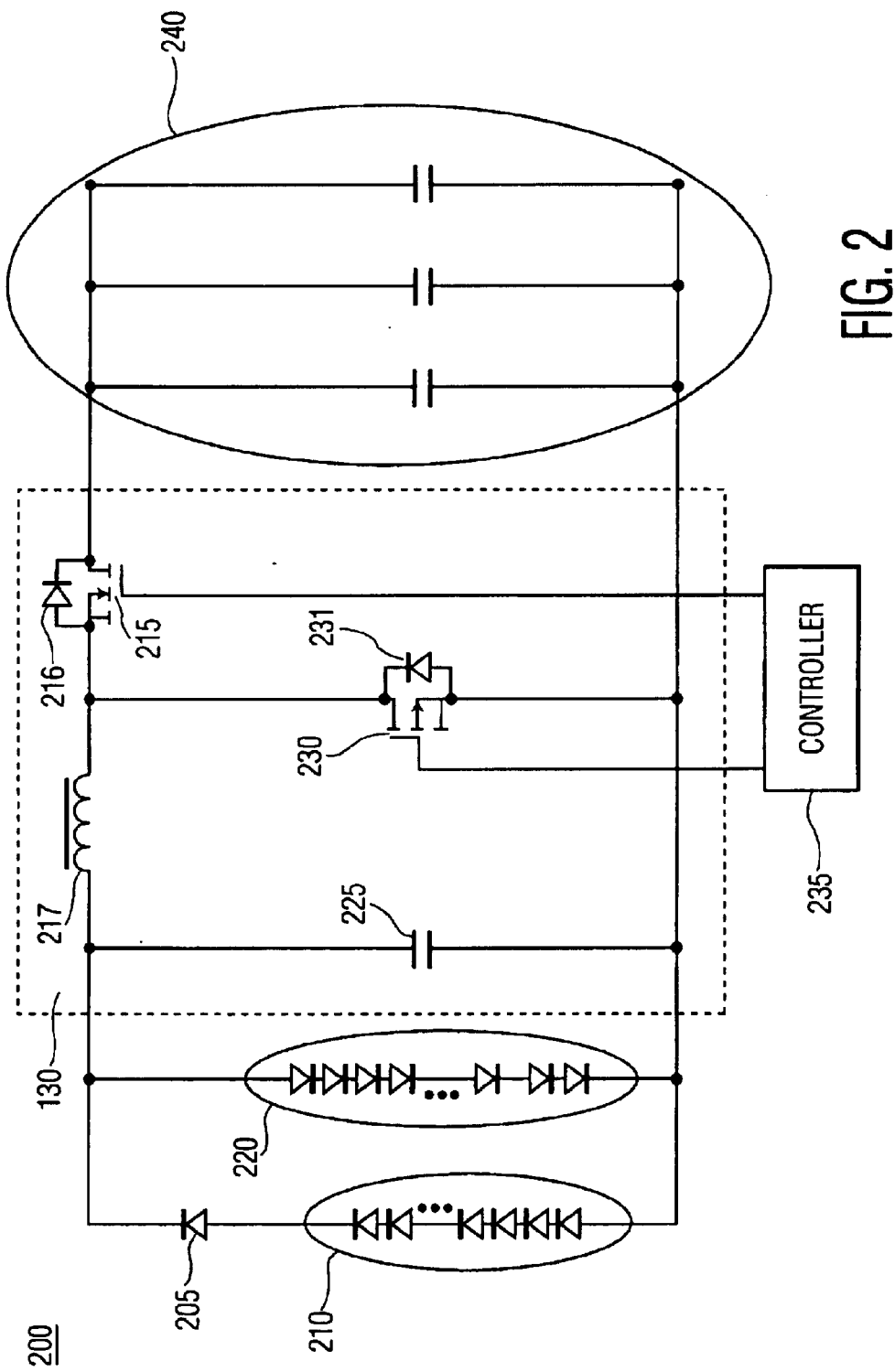
FIG. 2 is a schematic diagram of one embodiment of a system to provide an autonomous solid state lighting system in accordance with the present invention.

FIG. 2 shows a preferred embodiment of a system to provide an autonomous solid state lighting system in accordance with the present invention and shown generally at 200. The lighting system 200 may include the solid state energy source and may include at least one or more solar cell panels 210, one or more power diodes 205, one or more light energy sources which may include one or more LED modules 220, one or more inductors 217, one or more capacitors 225, one or more switches 215, 230 with internal rectifiers 216, 231, respectively, one or more energy storage devices which may be battery packs 240 and one controller 235. The bi-directional power converter 130 current in one direction from solid state energy source 210 to energy storage device 240 and passes current in the opposite direction from energy storage device 240 to solid state light source 220 and comprises inductor 217, capacitor 225, switch 215, and switch 230.

The LED module 220 and solar cell panel 210 with power diode 205 are connected in parallel with opposite polarity. The solar cell panel 210 and LED module 220 are selected so that when the solar cell panel 210 reaches its power peak, the voltage across the solar cell panel 210 is lower than the knee voltage of the LED module 220. This keeps the LED module 220 from turning on during the charge mode. Typical solar cell panels available commercially have specific output voltages (Vs), such as 6V, 12V, or 24V, for example. State of the art power LEDs typically have a knee voltage (Vknee) ranging from 1.44V to 2.25V for each LED within the LED module 220. To keep the voltage across the solar cell panel 210 lower than the knee voltage of the LED module 220, the number of LEDs (N) is selected so that the product of the individual LED knee voltage (Vknee) and the number of LEDs (N) is greater than the solar cell panel output voltage (Vs). The battery pack voltage (Vbp) of battery pack 240 can be selected to be greater than the larger of the solar cell panel output voltage (Vs) and the product of the number of LEDs (N) and the individual LED maximum operating voltage (Vled).

The lighting system collects and stores energy from sunlight during the day and converts the stored energy to light at night. During the daytime, the lighting system operates in a charge mode. The solar cell panel 210 generates power that is used to charge the battery pack 240 via the bi-directional power converter 130. The bi-directional power converter 130 is operated in boost mode to increase the voltage supplied to the battery pack 240 from the voltage generated at the solar cell panel 210. Switch 230 switches on and off at a high frequency as directed by the controller 235 and switch 215 is maintained in the open, non-conducting condition. The internal rectifier 216 of switch 215 is used as the rectifier diode. In another embodiment, the rectifier diode can be a separate diode external to the switch 215. In order to improve circuit efficiency, the bi-directional power converter 130 is designed and operated in boundary conduction mode with variable frequency. By using the boost mode, the system 200 can make best use of solar power during the sunrise and sunset periods when less power is being generated by the solar cell panel 210.

During the nighttime, the lighting system operates in a discharge mode. The energy stored in the battery pack 240 can be released to the LED module 220 via reverse operation of the bi-directional power converter 130 to provide lighting. The bi-directional power converter 130 is operated in buck mode to decrease the voltage supplied to the LED module 220 from the voltage supplied at the battery pack 240. Switch 215 switches on and off at a high frequency as directed by the controller 235 and switch 230 is maintained in the open, non-conducting condition. The bi-directional power converter 130 operates in the boundary conduction mode with variable frequency. Using the buck mode allows better control of current to the LED module 220. The power diode 205 is used to block any reverse current leakage that might damage the solar cell panel 210. In one embodiment, the lighting system 200 can switch between the charge and discharge mode at predetermined times when sunlight is expected to be available, i.e., calculated sunrise and sunset. In another embodiment, the switching between the charge and discharge mode can be performed when a sensor or circuit providing a signal to the controller 235 indicates a predetermined amount of light is being received at the solar cell panel 210. It is also possible to operate the bi-directional converter in continuous conduction mode and/or discontinuous conduction mode with fixed operating frequency. The controller 235 can manage the charge and discharge modes to maximize battery life and energy utilization.

Figure 3:
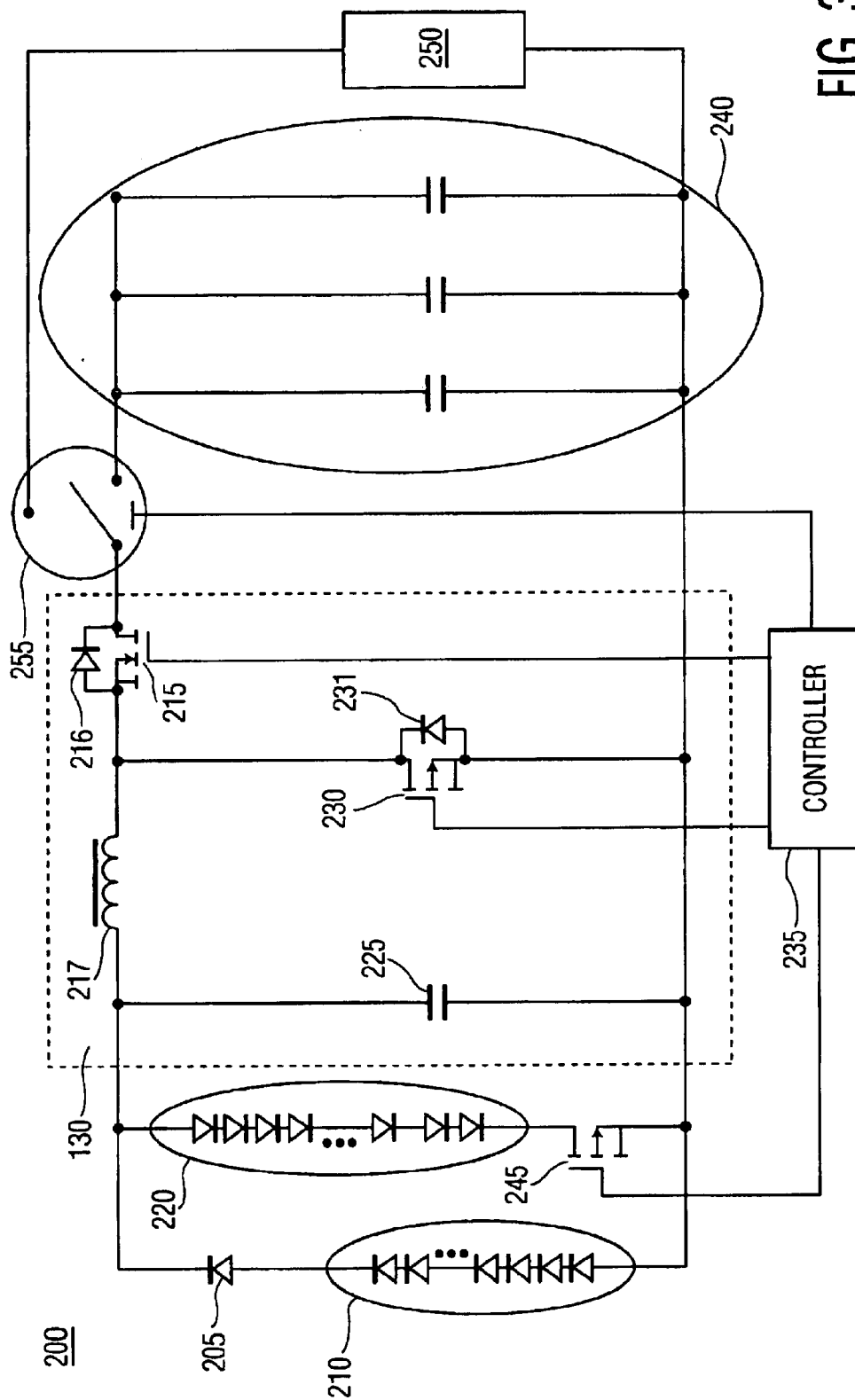
FIG. 3 is a schematic diagram of yet another embodiment of a system to provide an autonomous solid state lighting system in accordance with the present invention.

FIG. 3, in which like elements share like reference numbers with FIG. 2, shows another embodiment of a system to provide an autonomous solid state lighting system in accordance with the present invention. In this example, a switch has been added to provide additional flexibility in LED module and solar cell panel selection, and an alternative power source has been added. Although these features have been shown in a single embodiment, those skilled in the art will appreciate that either feature can be provided independently.

Addition of a switch to switch current through the LED module adds flexibility in selecting LED module and solar cell panel voltages. An LED switch 245 responsive to a signal from the controller 235 may be wired in series with the LED module 220. When the lighting system 200 is in the charging mode, i.e., when power is being supplied from the solar cell panel 210 to the battery pack 240, the LED switch 245 can be in an open, non-conducting condition to prevent the LED module 220 from lighting. The addition of the LED switch 245 avoids the restriction that the number of LEDs (N) be selected so that the product of the individual LED knee voltage (Vknee) and the number of LEDs (N) is greater than the solar cell panel output voltage (Vs). When the switch 245 is open, the voltage across each individual LEDs in the LED module 220 is below the knee voltage to avoid illumination, so there is no restriction on the voltage across the LED module 220 due to the voltage from the solar cell panel 210. When the lighting system 200 is in the discharging mode, i.e., when power is being supplied from the battery pack 240 to the LED module 220, the LED switch 245 can be closed to allow the LED module 220 to light.

An alternative power supply 250, such as a fuel cell pack, can be added to provide an additional power source for lighting the LED module. Referring to FIG. 3, a fuel cell pack may be switched to replace battery pack 240. The alternative power supply 250 and battery pack 240 may be alternately selected to power the LED module 220 through single pole double throw switch 255 responsive to a signal from the controller 235. In alternate embodiments, the alternative power supply can be a different means for supplying power, such as an auxiliary battery or a small generator. In other embodiments, actuation of the switch 255 can be controlled by a dedicated controller or manually.

Figure 4:
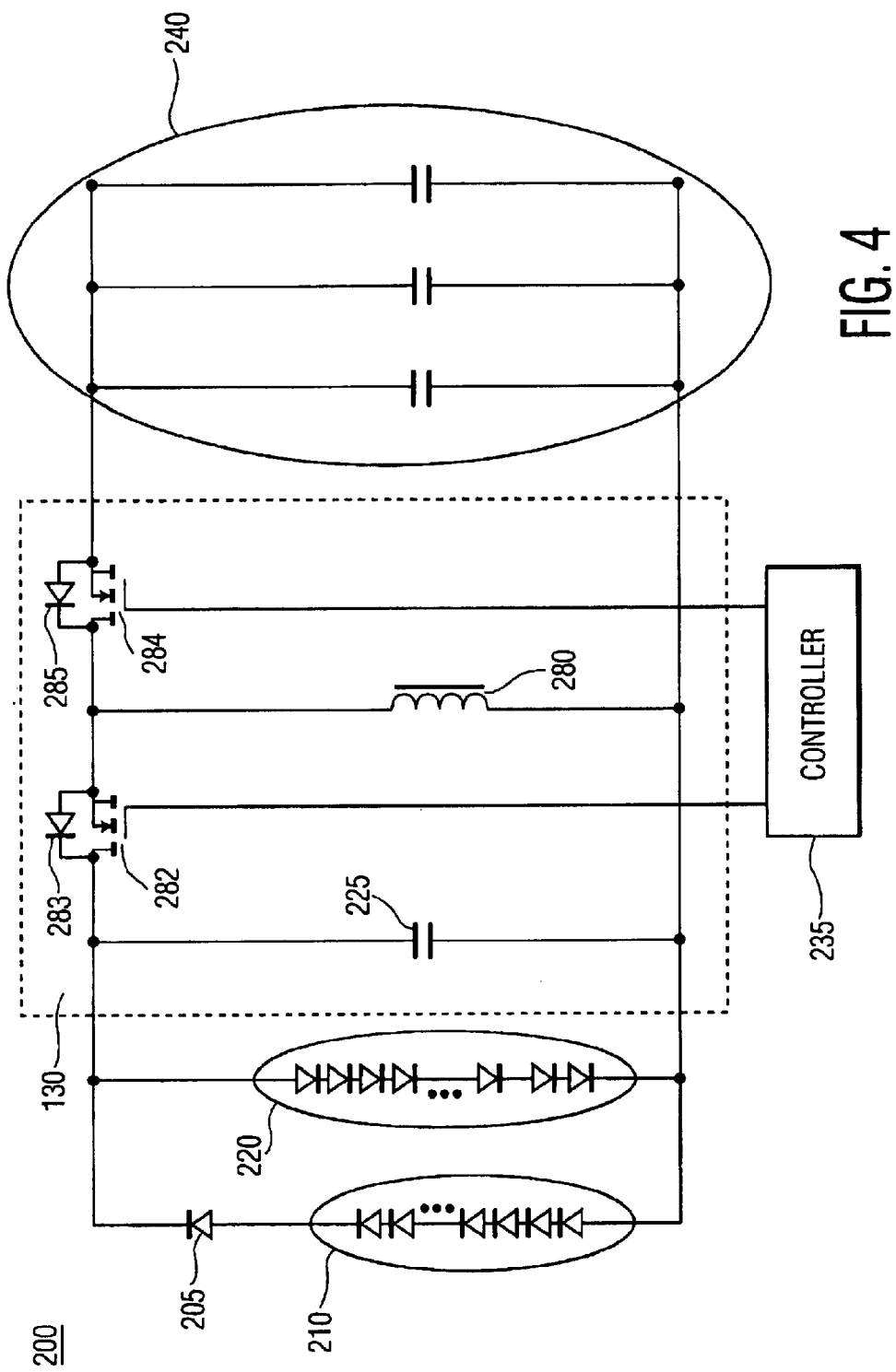
FIG. 4 is a schematic diagram of yet another embodiment of a system of provide an autonomous solid state lighting system in accordance with the present invention.

FIG. 4, in which like elements share like reference numbers with FIG. 2, shows yet another embodiment of a system to provide an autonomous solid state lighting system in accordance with the present invention. The bi-directional power converter 130 comprises inductor 280, capacitor 225, switch 282 with internal rectifier 283, and switch 284 with internal rectifier 285. The bi-directional power converter 130 operates as a bi-directional Buck-Boost converter. The design of the bi-directional power converter 130 avoids the restriction that the number of LEDs (N) be selected so that the product of the individual LED knee voltage (Vknee) and the number of LEDs (N) is greater than the solar cell panel output voltage (Vs). In the charge mode, when power is flowing from the solar cell panel 210 to the battery pack 240, the controller 235 switches switch 282 and opens switch 284. In the discharge mode, when power is flowing from the battery pack 240 to the LED module 220, the controller 235 switch 282 and switches switch 284.

While the embodiments of the present invention disclosed herein are presently considered to be preferred, various changes and modifications can be made without departing from the spirit and scope of the invention. For example, the lighting system can receive light from an artificial lighting system rather than from the sun. The scope of the invention is indicated in the appended claims, and all changes that come within the meaning and range of equivalents are intended to be embraced therein.

What is claimed is:

1. A method of providing an autonomous solid state lighting system comprising:
    collecting electric power from a solid state energy source;
    increasing the voltage of the electric power using a bi-directional power converter;
    storing the higher voltage electric power;
    decreasing the voltage of the stored electric power using the bi-directional power converter; and
    powering a solid state light source with the lower voltage electric power.

2. The method of claim 1 further comprising preventing the solid state light source from lighting while collecting electric power from the solid state energy source.

3. The method of claim 2 wherein preventing the solid state light source from lighting comprises selecting the solid state light source so that voltage required to turn on the solid state light source is greater than voltage supplied by the solid state energy source.

4. The method of claim 2 wherein preventing the solid state light source from lighting comprises switching off the solid state light source while collecting electric power from the solid state energy source.

5. The method of claim 1 further comprising preventing reverse current flow through the solid state energy source while powering the solid state light source with the lower voltage electric power.

6. The method of claim 1 further comprising providing an alternative power supply to power the solid state light source.

7. An autonomous solid state lighting system comprising:
    means for collecting electric power, the electric power collecting means being solid state,
    bi-directional means for converting the voltage of the electric power;
    means for storing the electric power; and
    means for lighting, the lighting means being solid state;
    wherein the converting means increases the voltage of the electric power collected from the electric power collecting means for storage in the electric power storing means, and decreases the voltage of the electric power stored in the electric power storing means for powering the lighting means.

8. The system of claim 7 further comprising means for preventing reverse current flow through the electric power collecting means while powering the lighting means.

9. The system of claim 7 further comprising an alternate means for powering the lighting means, and
    switching means selectively coupling the power storing means and the alternate powering means to the solid state lighting means via the voltage converting means.

10. The autonomous solid state lighting system as claimed in claim 7 further comprising:
    means for coupling the solid state electric power collecting means and the solid state lighting means in parallel, and wherein
    the solid state lighting means has a threshold voltage below which it does not emit light and above which it will emit light, and the threshold voltage is higher than the output voltage of the solid state electric power collecting means.

11. The autonomous solid state lighting system as claimed in claim 7 further comprising a controller for controlling the bi-directional voltage converting means.

12. The autonomous solid state lighting system as claimed in claim 7 further comprising:
    means for coupling the solid state electric power collecting means and the solid state lighting means directly in parallel, and a diode connected in series circuit with the solid state electric power collecting means so as to prevent a reverse current flow through the solid state electric power collecting means.

13. The autonomous solid state lighting system as claimed in claim 11 wherein the bi-directional voltage converting means comprises:

a capacitor, an inductor, first and second transistor switching devices, means for coupling the capacitor, the inductor and the first and second transistor switching devices together so as to form the bi-directional voltage converting means, and wherein the controller controls the first and second transistor switching devices so as to operate them in mutually exclusive time intervals so as to provide a charge mode of operation for the electric power storing means and a discharge mode of operation therefor.

14. An autonomous solid state lighting system comprising:

means for collecting electric power, the electric power collecting means being solid state;

means for converting the voltage of the electric power;

means for storing the electric power;

means for lighting, the lighting means being solid state;

wherein the voltage converting means increases the voltage of the electric power collected from the electric power collecting means for storage in the electric power storing means, and decreases the voltage of the electric power stored in the electric power storing mans for powering the lighting means, and means for preventing lighting of the lighting means while collecting electric power.

15. The system of claim 14 wherein the lighting preventing means comprises means for switching off the lighting means while collecting electric power.

16. The autonomous solid state lighting system as claimed in claim 15 wherein the switching means is connected in series circuit with the solid state lighting means, and further comprising;

a controller for controlling the voltage converting means and the switching means.

17. An autonomous solid state lighting system comprising:

a bi-directional power converter that passes current in opposite directions;

a solar cell panel operably connected to the bi-directional power converter;

a battery pack operably connected to the bi-directional power converter;

a light emitting diode (LED) module operably connected to the bi-directional power converter; and a controller, the controller controlling the bi-directional power converter.

18. The system of claim 17 wherein:

the solar cell panel provides a solar cell panel output voltage Vs;

the LED module comprises a number of LEDs N connected in series, the LEDs having an individual knee voltage Vknee; and the product of the individual knee voltage Vknee and the number of LEDs N is greater than the solar cell panel output voltage Vs.

19. The system of claim 17, wherein:

the solar cell panel provides solar cell panel output voltage Vs;

the battery pack provides a battery pack voltage Vbp;

the LED module comprises a number of LEDs N connected in series, the LEDs having an individual LED maximum operating voltage Vled; and the battery pack voltage Vbp is greater than the larger of the solar cell panel output voltage Vs and the product of the number of LEDs N and the individual LED maximum operating voltage Vled.

20. The system of claim 17, further comprising an LED switch operably connected to control the LED module and under control of the controller.

21. The system of claim 17 further comprising a power diode directly connected to the solar cell panel.

22. The system of claim 17 further comprising;

an alternative power supply and a switch responsive to the controller to switch the bi-directional power converter between the battery pack and the alternative power supply.

23. The system of claim 22 wherein the alternative power supply is selected from the group consisting of a fuel cell pack, an auxiliary battery, and a small generator.

24. The system of claim 17 wherein the bi-directional power converter further comprises:

an inductive/capacitive circuit operably connected to the LED module and the solar cell panel;

a first switch, the first switch being responsive to the controller;

a first rectifier diode connected across the first switch;

a second switch, the second switch being responsive to the controller; and a second rectifier diode connected across the second switch;

wherein the first switch an the second switch are connected in series across the battery pack, the inductive/capacitive circuit as operably connected to the first switch and the second switch, the controller opens the first switch and switches the second switch in a charge mode, and the controller opens the second switch and switches the first switch in a discharge mode.

25. The system of claim 24 wherein the first rectifier diode is internal to the first switch and the second rectifier diode is internal to the second switch.

26. The system of claim 17 wherein the bi-directional power converter further comprises:

a capacitive circuit operably connected to the LED module and the solar cell panel;

an inductive circuit operably connected to the battery pack;

a first switch, the first switch being responsive to the controller;

a first rectifier diode connected across the first switch;

a second switch, the second switch being responsive to the controller; and a second rectifier diode connected across the second switch;

wherein the first switch is operably connected between the capacitive circuit and the inductive circuit, the second switch is operably connected between the inductive circuit and the battery pack, the controller switches the first switch and opens the second switch in a charge mode, and the controller opens the first switch and switches the second switch in a discharge mode.

* * * * *